United States Patent
Yang et al.

(10) Patent No.: US 10,225,174 B2
(45) Date of Patent: *Mar. 5, 2019

(54) APPARATUS AND METHOD TO HIDE TRANSIT ONLY MULTI-ACCESS NETWORKS IN OSPF

(71) Applicant: Cisco Technology, Inc., San Jose, CA (US)

(72) Inventors: Yi Yang, Morrisville, NC (US); Alvaro E. Retana, Raleigh, NC (US); James L. Ng, Mebane, NC (US); Abhay Roy, Santa Clara, CA (US); Alfred C. Lindem, Cary, NC (US); Sina Mirtorabi, Santa Clara, CA (US); Timothy M. Gage, Durham, NC (US); Syed Khalid Raza, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 165 days.

This patent is subject to a terminal disclaimer.

(21) Appl. No.: 15/156,215

(22) Filed: May 16, 2016

(65) Prior Publication Data

US 2016/0261485 A1 Sep. 8, 2016

Related U.S. Application Data

(63) Continuation of application No. 14/013,990, filed on Aug. 29, 2013, now Pat. No. 9,356,856.

(51) Int. Cl.
*H04L 12/751* (2013.01)
*H04L 12/755* (2013.01)
(Continued)

(52) U.S. Cl.
CPC ............ *H04L 45/021* (2013.01); *H04L 45/02* (2013.01); *H04L 45/025* (2013.01); *H04L 45/54* (2013.01);
(Continued)

(58) Field of Classification Search
None
See application file for complete search history.

(56) References Cited

U.S. PATENT DOCUMENTS 6,339,595 B1  1/2002 Rekhter et al.
6,418,139 B1  7/2002 Akhtar
(Continued)

OTHER PUBLICATIONS

Moy, OSPF Version 2, Apr. 1998, Request for Comments (RFC) 2328, pp. 1-244. (Year: 1998).*

*Primary Examiner* — Nicholas Sloms

(74) *Attorney, Agent, or Firm* — Polsinelli PC

(57) ABSTRACT

In one embodiment, a first router determines whether an interface coupling the first router to one or more second routers is transit-only. When the interface is transit-only, the first router generates an Open Shortest Path First (OSPF) Link State Advertisement (LSA) that includes an address for the interface and a designated network mask. The designated network mask operates as a transit-only identification that indicates the address should not be installed in a Routing Information Base (RIB) upon receipt of the OSPF LSA at the one or more second routers. When the network is not transit-only, the first router generates an OSPF LSA that includes the address for the interface but does not include the designated network mask, to permit installation of the address in a RIB upon receipt of the OSPF LSA at the one or more second routers.

20 Claims, 4 Drawing Sheets

(51) Int. Cl.
*H04L 12/741* (2013.01)
*H04L 12/773* (2013.01)
*H04L 12/801* (2013.01)
*H04L 29/06* (2006.01)

(52) U.S. Cl.
CPC .............. *H04L 45/60* (2013.01); *H04L 47/10* (2013.01); *H04L 63/0407* (2013.01)

(56) References Cited

U.S. PATENT DOCUMENTS

| | | | |
|---|---|---|---|
| 6,473,421 B1 | 10/2002 | Tappan | |
| 6,768,739 B1 | 7/2004 | Kobayashi et al. | |
| 6,917,983 B1 | 7/2005 | Li | |
| 6,999,454 B1 | 2/2006 | Crump | |
| 7,047,315 B1 | 5/2006 | Srivastava | |
| 7,088,718 B1 | 8/2006 | Srivastava | |
| 7,133,403 B1 | 11/2006 | Mo et al. | |
| 7,173,912 B2 | 2/2007 | Jaber et al. | |
| 7,209,976 B2 | 4/2007 | Folkes et al. | |
| 7,281,129 B2 | 10/2007 | Zaborovksy et al. | |
| 7,292,535 B2 | 11/2007 | Folkes et al. | |
| 7,307,990 B2 | 12/2007 | Rosen et al. | |
| 7,532,631 B2 | 5/2009 | Raszuk et al. | |
| 7,561,571 B1 | 7/2009 | Lovett et al. | |
| 7,649,834 B2 | 1/2010 | Badat et al. | |
| 7,664,110 B1 | 2/2010 | Lovett et al. | |
| 7,685,281 B1 | 3/2010 | Saraiya et al. | |
| 7,697,416 B2 | 4/2010 | Shand et al. | |
| 7,929,524 B2 | 4/2011 | Yang et al. | |
| 8,023,517 B2 | 9/2011 | Yang et al. | |
| 2002/0006112 A1 | 1/2002 | Jaber et al. | |
| 2003/0016678 A1 | 1/2003 | Maeno | |
| 2003/0043820 A1 | 3/2003 | Goringe et al. | |
| 2003/0218982 A1 | 11/2003 | Folkes et al. | |
| 2004/0006640 A1 | 1/2004 | Inderieden et al. | |
| 2004/0039839 A1 | 2/2004 | Kalyanaraman et al. | |
| 2004/0258016 A1 | 12/2004 | Schmidt et al. | |
| 2005/0041596 A1 | 2/2005 | Yokomitsu et al. | |
| 2005/0074003 A1 | 4/2005 | Ball et al. | |
| 2005/0094566 A1 | 5/2005 | Hares | |
| 2005/0213557 A1 | 9/2005 | Hwang et al. | |
| 2006/0034171 A1* | 2/2006 | Rajsic | H04L 12/5601 370/235 |
| 2006/0056328 A1 | 3/2006 | Lehane et al. | |
| 2006/0056411 A1* | 3/2006 | Badat | H04L 41/12 370/392 |
| 2006/0159082 A1 | 7/2006 | Cook et al. | |
| 2006/0233181 A1 | 10/2006 | Raszuk et al. | |
| 2007/0016637 A1 | 1/2007 | Brawn et al. | |
| 2007/0237095 A1 | 10/2007 | Yang et al. | |
| 2008/0062861 A1 | 3/2008 | Shand et al. | |
| 2008/0080494 A1 | 4/2008 | Yang et al. | |
| 2011/0222550 A1 | 9/2011 | Yang et al. | |
| 2014/0129736 A1 | 5/2014 | Yu | |

\* cited by examiner

APPARATUS AND METHOD TO HIDE TRANSIT ONLY MULTI-ACCESS NETWORKS IN OSPF

RELATED APPLICATIONS

This application is a continuation of U.S. patent application Ser. No. 14/013,990, filed on Aug. 29, 2013 and entitled "APPARATUS AND METHOD TO HIDE TRANSIT ONLY MULTI-ACCESS NETWORKS IN OSPF," which is a continuation of U.S. patent application Ser. No. 13/048,731, filed on Mar. 15, 2011 and entitled "APPARATUS AND METHOD TO HIDE TRANSIT ONLY MULTI-ACCESS NETWORKS IN OSPF," which is a continuation of U.S. patent application Ser. No. 11/537,275, filed on Sep. 29, 2006 and entitled "APPARATUS AND METHOD TO HIDE TRANSIT ONLY MULTI-ACCESS NETWORKS IN OSPF," the contents of which are incorporated by reference herein in their entirety.

FIELD OF THE INVENTION

This invention relates to routers. More particularly, this invention relates to routers that are only connected to other routers in a network. Still more particularly, this invention relates to a method for protecting interfaces on these routers from the network to increase security of the network.

BACKGROUND

In today's home and business environment there are many different types of digital networks that allow processing systems to communicate and transmit data between one another. As the size of these networks increases, more routers or other switching systems are needed in the network to transmit data between processing systems. Some systems are so large that some routers have interfaces that are connected directly to other routers to transmit data over the other routers to other systems.

One method for determining a path for transmitting data from one processing system over the network to another system is Open Shortest Path First (OSPF). In OSPF, a router receives Link State Advertisements (LSA) from other routing systems. Each LSA indicates a connection of a router to another system or router. A router then stores the received LSAs and uses the LSAs to determine the path over which to transmit data to a particular address. In the larger networks, the connections between routers are used to transmit data. However, the addresses of the interfaces that connect a router to another router are not needed. Thus, transmitting LSAs with the addresses of these interfaces is a problem. The addresses of the interfaces are installed in Router Information Base (RIB) of other routers when received in an LSA. This wastes router resources as the addresses are stored in the RIB and then the router advertises the link.

Another problem with advertising the addresses for these interfaces is that an attacker can launch an attack on the network by sending packets to one of these interfaces. Thus, there is a need in the art for a system to hide these interfaces from the network to improve convergence of the network and to increase security.

BRIEF DESCRIPTION OF THE DRAWINGS

The features and advantages of this invention are described in the following detailed description and are shown in the following drawings.

DETAILED DESCRIPTION

This invention relates to a method to hide transit-only interfaces in a network. For purposes of this discussion, transit-only interfaces are interfaces which directly connect one router to another router. In accordance with the present invention, the routers perform applications which hide the transit-only interfaces in a network in accordance with this invention. These applications may be performed as software, hardware, and/or firmware that are included in the router.

Figure 1:
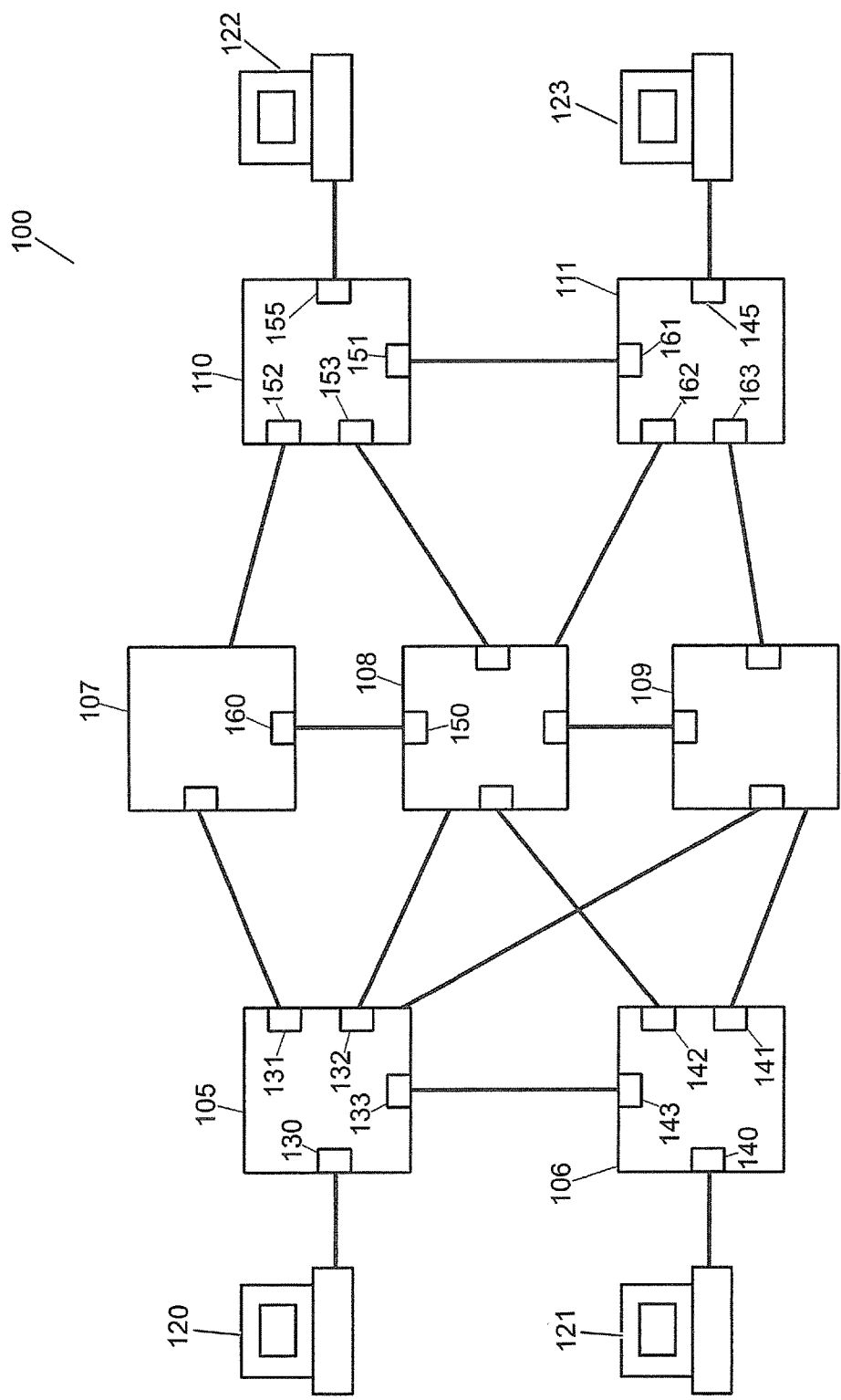
FIG. 1 illustrating an exemplary network having transit-only routers operating in accordance with this invention.

FIG. 1 illustrates a network that includes routing systems that have transit-only interfaces in accordance with this invention. Network 100 includes routing systems 105-111. Routing systems 105-111 are routers, switches, or other processing devices that transmit data to other systems over networks 100. One skilled in the art will recognize that network 100 is shown for illustrative purposes only and the exact configuration of a network is not important to implementing this invention. Thus, the exact configuration and size of a network implementing processes in accordance with this invention are left to one skilled in the art designing a system implementing processes in accordance with this invention. Furthermore, the connection and interfaces of the routing systems shown are for exemplary purposes. The exact number of interfaces and the connections to the interfaces are left to those skilled in the art.

The routing systems in network 100 use OSPF to determine a path for transmitting a packet from one processing system to another. In the exemplary embodiment shown, OSPFv2 is used to make determinations of the paths for transmission of packets. In OSPFv2, Internet Protocol (IP) version 4 (IPv4) addressing is used. Although discussed in terms OSPFv2 and IPv4, one skilled in the art will recognize that this invention may be implemented in other protocols using other addressing strategies.

In network 100, routing systems 105, 106, 110, and 111 connect servers 120-123 to network 100. Routing system 105 connects to server 120 via interface 130 and connects to other routers 106-108 via interfaces 131-133. Routing system 106 connects to server 121 via interface 140 and interfaces 141-143 connect routing system 106 to other routing systems. Routing system 110 connects to server 122 via interface 155 and to other routing systems via interfaces 151-153. Routing system 111 connects to server 123 via interface 145 and to other routing systems via interfaces 161-163.

In network 100, routing systems 107-109 are transit-only routing systems. Routing systems 107-109 are transit-only routing systems because these routing systems are only connected to other routing systems to transmit data between the routing systems that connect processing systems to the network. For example, interface 150 in routing system 108 connects routing system 108 to an interface 160 of routing systems 107.

Routing systems may only have one or a portion of the interfaces in the router that are transit-only. For example, routing system 105 has an interface 133 that connects routing system 105 to routing system 106 via interface 143. Thus, a system for hiding transit-only interfaces may be implemented in all routing systems in network 100.

Figure 2:
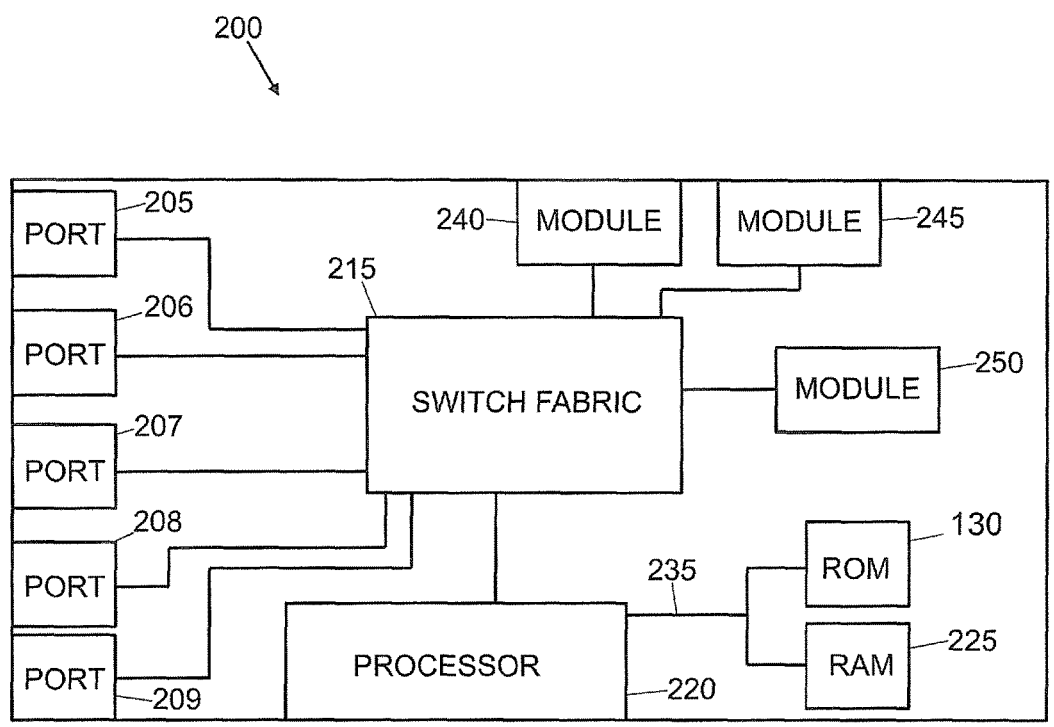
FIG. 2 illustrating a block diagram of components of a routing system operating in accordance with this invention.

FIG. 2 shows a router 200. Routing systems 105-111 (Shown in FIG. 1) are all examples of router 200. Router 200 is a routing and/or switching system that transmits digital data, in the form of packets between processing systems connected to a network. One skilled in the art will recognize that router 200 may be a router, switch or any other processing system that receives and transmits digital data.

Router 200 includes ports 205-209. Ports 205-209 connect router 200 to other processing systems in a network. The other processing systems that may be connected include computers, other routers or any other digital processing system. One skilled in the art will further recognize that ports 205-209 are shown for exemplary purposes only and the exact number and configuration of the ports are left to one skilled in the art designing a specific router.

Ports 205-209 are connected to switch circuitry 215. Switch circuitry 215 is circuitry that transmits received packets to the proper ports for delivery to the proper address. One skilled in the art will recognize that there are many different types of circuitry that may be used to transmit packets between proper ports and an explanation of the switching circuitry is not critical to this invention and is omitted for brevity.

Processing unit 220 is connected to switching circuitry 215. Processing unit 220 is a processor, microprocessor, or any combination of processors and microprocessors that execute instructions to perform applications for performing functions in router 200. Processing unit 220 is also connected to a volatile memory 225 and a non-volatile memory 230 via memory bus 235.

Volatile memory 225 is a memory such as a Random Access Memory (RAM). A volatile memory stores instructions and data used by processing unit 220 to perform applications. One such application is a routing operating system. The routing operating system is an application or applications which allow router 200 to perform other applications that provide the functions of router 200. An example of a routing operating system is Inter-network Operating System (IOS) designed by Cisco Systems Inc. One Skilled in the art will recognize that many different types of memory may be used a non-volatile memory such SRAM and DRAM.

Non-volatile memory 230 is a memory such as a Read Only Memory (ROM). Non-volatile memory 230 stores configuration and other vital information for router 200. One skilled in the art will recognize that there are many different types of memory that may be used as a non-volatile memory.

Modules 240, 245, and 250 are connected to switching circuitry 215. Modules 240, 245, and 250 are devices and/or software that prepare specific features in router 200. An example of a module is a Voice Over Internet Protocol (VoIP) module for providing telephonic communications to processing devices connected to router 200. One skilled in the art will recognize that the number of modules and the functions that each module provides may be determined by one skilled in the art designing a particular router.

In accordance with this invention, a system for hiding transit-only interfaces of routing systems is provided by processes executed by the routing systems as shown by the following exemplary embodiments. One skilled in the art will recognize that the following processes may be executed by software, firmware, hardware, and/or any combination of the preceding components.

Figure 3:
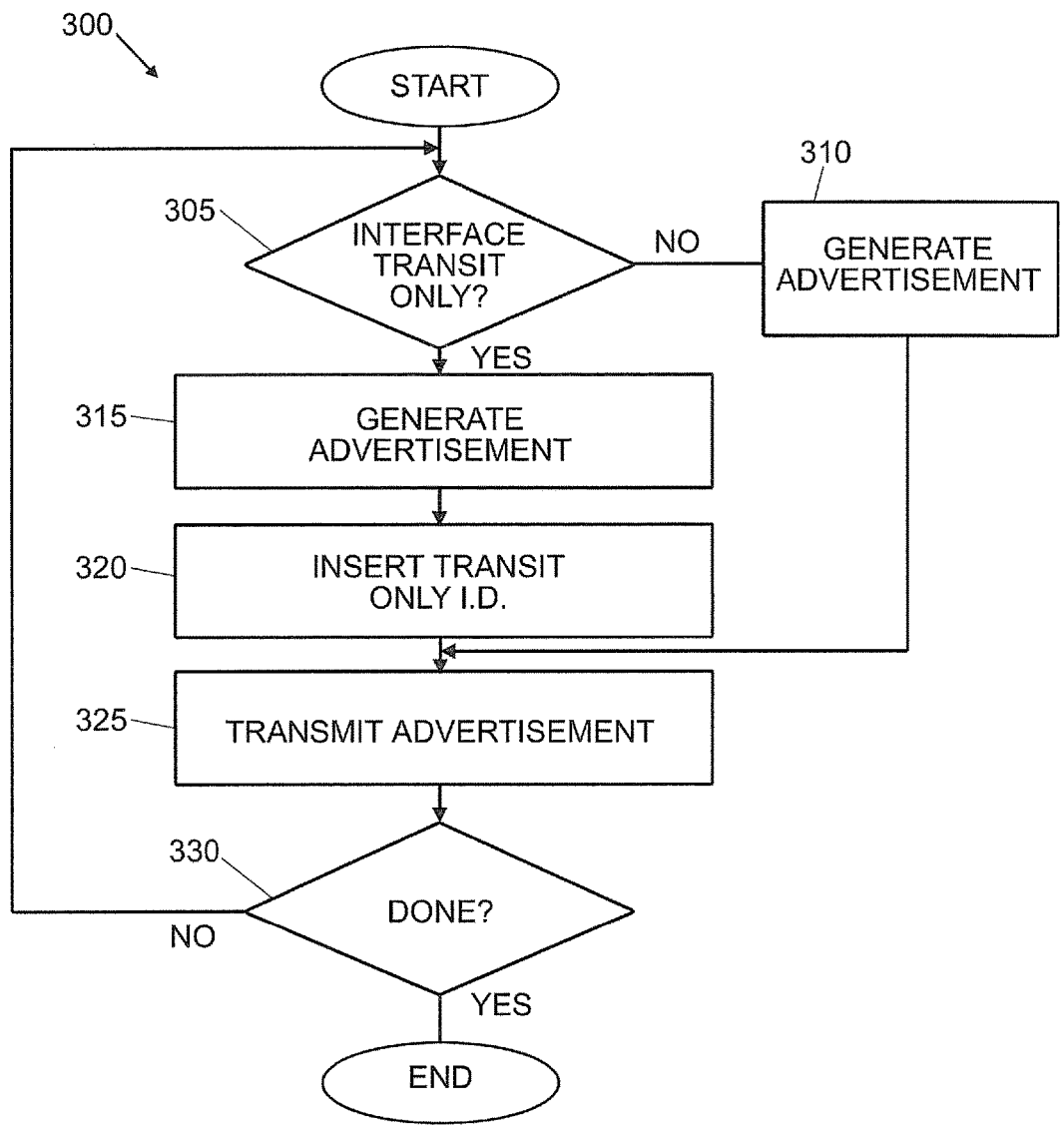
FIG. 3 illustrating a flow diagram of an exemplary process for generating and transmitting a link state advertisement in accordance with this invention.
Figure 4:
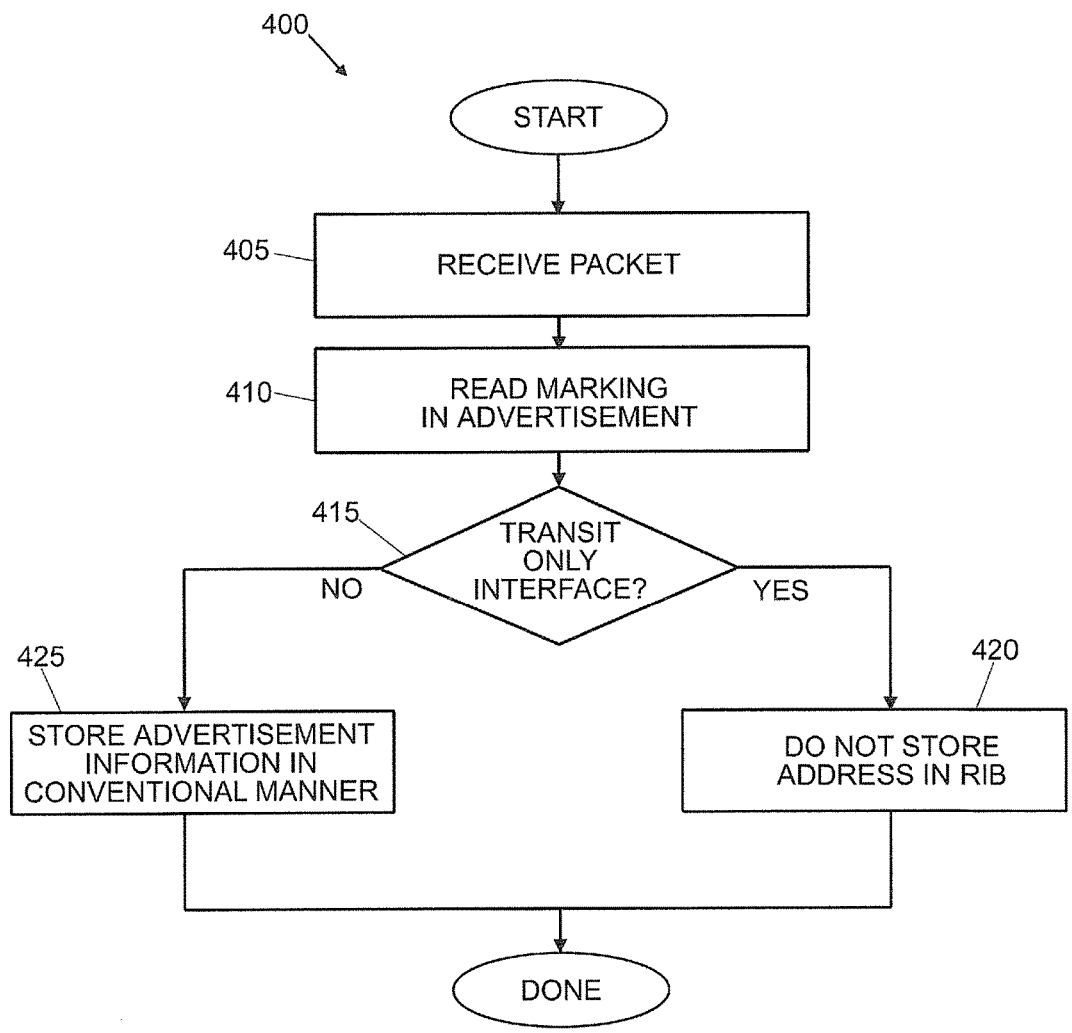
FIG. 4 illustrating a flow diagram of an exemplary process for receiving and handling a link state advertisement generated in accordance with this invention.

In order to hide transit-only interfaces, a routing system must be able to identify a transit-only interface to other routing systems and the other routing systems must know how to handle an interface that is identified as transit only. FIG. 3 illustrates an exemplary embodiment of a process executed by a first routing system to identify transit-only interface in advertisements. FIG. 4 then illustrates an exemplary embodiment of a process for a router receiving an advertisement of a transit-only interface and storing the information.

FIG. 3 illustrates an exemplary process 300 executed by a routing system to identify a transit-only interface to other routing systems. Process 300 begins in step 305 by the routing system determining that an interface is a transit-only interface. The determination is performed in a typical manner that a routing system performs detections of connections to the routing system. If the interface is determined not to be a transit-only interface, the routing system generates an advertisement in a normal manner in accordance with the art in step 310. One skilled in the art will recognize that the advertisement is an LSA in OSPF and is generated in the manner defined in OSPF. The advertisement is then transmitted in the normal manner in step 325.

If the interface is determined to be transit only, an advertisement is generated in step 315. In the preferred embodiment, the advertisement is an LSA and is generated in a typical manner. After the advertisement is generated, a transit-only identification is inserted into the packet to indicate that the advertised interface is transit-only in step 320.

In exemplary embodiments, there are a variety of manners in which an advertisement for a transit-only interface may be marked. A first method for marking a transit-only interface is by placing an invalidate and/or non-continuous network mask instead of the configured value for the network. For example, the value 0x00000001 may be inserted instead of the configured value. Because the network mask is invalid the OSPF does not install the address in the RIB. In a network using this method, some vendors may do a sanity check and when the advertisements with invalid masks are detected, these advertisements may be dropped. This could disrupt communications over the network.

A second method for marking advertisements for transit only interfaces uses a valid, designated network mask, such as, a network mask that should not be used in a multi-access network. Some examples of this include 0xffffffff and 0xfffffffe. Routing systems using a system in accordance with the invention must not place the advertised addresses in the RIB. However, non-upgrades systems will still flood the networks with the advertisements. Thus, this method is more predictable than using an invalid mask. However, the host addresses of a transmitting routing system may be installed in the RIBs of non-upgraded systems. Thus, the interfaces may still be attacked.

A third method for marking advertisements for transit-only interfaces is to place a flag or administrative tag in the advertisements. Such tags are described in the IETF draft of "Extensions to OSPFv2 for advertising Optional Rout/Link Attributes." This will require all routers to be upgraded to read the tag and recognize the advertisement is for a transit-only interface. Furthermore, this method requires support of opaque Link State Advertisements. This may cause backward compatibility issues.

After the advertisement is generated and the mask is inserted, the advertisement is transmitted in the conventional manner in step 325. In step 330, the router determines whether all of the advertisements for interfaces have been transmitted. If there are more advertisements to generate, process 300 repeats for step 305. Otherwise process 300 ends.

FIG. 4 illustrates an exemplary process executed by a routing system when an advertisement is received to hide a transit-only interface in accordance with this invention. Process 400 begins in step 405 with an advertisement being received by the routing system. In step 410, the identifier is read.

The routing system then determines whether the advertised address is a transit-only interface in step 415. If the first method of using an invalid mask is used, all routing systems will recognize the invalid mask and not install the address in the RIB. If the second or third methods are used, the receiving routing systems must be upgraded to detect the identifier. If the identifier is read from the advertisement, the advertisement information is stored in a conventional manner. However, the advertised address is not stored in RIB of the routing system in step 420. If the identifier is not read, the advertised information is stored in the conventional manner in step 425. Process 400 then ends.

The above is a description of exemplary embodiments of a method for hiding transit-only interfaces in a network. It is envisioned that those skilled in the art can and will design alternative systems for hiding transit-only interfaces that infringe on this invention as set forth in the following claims either literally or through Doctrine of Equivalents.

The invention claimed is:

1. A method comprising:
   detecting one or more connection to a first router of a network;
   determining that a first interface coupling the first router to at least a second router is a transit-only interface based at least upon the one or more connections, wherein the transit-only interface directly connects the first router to the at least the second router for transmission of data between the first router and the at least the second router; and
   generating a first Open Shortest Path First (OSPF) Link State Advertisement (LSA) that includes an address and a designated network mask, the designated network mask operating as a transit-only identification, the transit-only identification indicating that the address is not permitted to be installed in a Routing Information Base (RIB) of the at least the second router upon receipt of the OSPF LSA at the at least the second router;
   wherein, upon receipt of the OSPF LSA at the at least the second router, the address is not installed in the RIB of the at least the second router.

2. The method of claim 1, further comprising:
   determining that a second interface coupling the first router to at least a third router is a not a transit-only interface based at least upon the one or more connections; and
   generating a second OSPF LSA that includes the address for the network but does not include the designated network mask, to permit installation of the address in a RIB of the at least the third router upon receipt of the second OSPF LSA at the at least the third router.

3. The method of claim 2, further comprising:
   sending the second OSPF LSA to the at least the third router; and
   causing the at least the third router to determine that the second OSPF LSA does not include the designated network mask.

4. The method of claim 3, further comprising:
   causing the at least the third router to permit installation of the address in the RIB of the at least the third router.

5. The method of claim 1, further comprising:
   sending the first OSPF LSA to the at least the second router; and
   causing the at least the second router to determine that the first OSPF LSA includes the designated network mask.

6. The method of claim 5, further comprising:
   causing the at least the second router to prevent installation of the address in the RIB of the at least the second router.

7. The method of claim 1, wherein the designated network mask is one of 0xffffffff, 0xfffffffe, or 0x00000001.

8. The method of claim 1, wherein the first router is configured to determine a path for transmitting data using OSPF version 2(OSPFv2).

9. An apparatus of a network, comprising:
   a processor;
   a first interface coupling the apparatus to at least a second apparatus; and
   a computer-readable medium storing instructions that, when executed by the processor, cause the apparatus to perform operations comprising:
   detecting one or more connection to the apparatus;
   determining that the first interface is a transit-only interface based at least upon the one or more connections, wherein the transit-only interface directly connects the first apparatus to the at least the second apparatus for transmission of data between the first apparatus and the at least the second apparatus; and
   generating a first Open Shortest Path First (OSPF) Link State Advertisement (LSA) that includes an address and a designated network mask, the designated network mask operating as a transit-only identification, the transit-only identification indicating that the address is not permitted to be installed in a Routing Information Base (RIB) of the at least the second apparatus upon receipt of the OSPF LSA at the at least the second apparatus;
   wherein, upon receipt of the OSPF LSA at the at least the second router, the address is not installed in the RIB of the at least the second router.

10. The apparatus of claim 9, further comprising a second interface coupling the apparatus to at least a third apparatus, wherein the instructions, when executed by the processor, cause the apparatus to perform operations further comprising:
    determining that the second interface is a not a transit-only interface based at least upon the one or more connections; and
    generating a second OSPF LSA that includes the address for the network but does not include the designated network mask, to permit installation of the address in a RIB of the at least the third apparatus upon receipt of the second OSPF LSA at the at least the third apparatus.

11. The apparatus of claim 10, wherein the instructions, when executed by the processor, cause the apparatus to perform operations further comprising:
    sending the second OSPF LSA to the at least the third apparatus; and
    causing the at least the third apparatus to determine that the second OSPF LSA does not include the designated network mask.

12. The apparatus of claim 11, wherein the instructions, when executed by the processor, cause the apparatus to perform operations further comprising:

causing the at least the third apparatus to permit installation of the address in the RIB of the at least the third apparatus.

13. The apparatus of claim 9, wherein the instructions, when executed by the processor, cause the apparatus to perform operations further comprising:
   sending the first OSPF LSA to the at least the second apparatus; and
   causing the at least the second apparatus to determine that the first OSPF LSA includes the designated network mask.

14. The apparatus of claim 13, wherein the instructions, when executed by the processor, cause the apparatus to perform operations further comprising:
   causing the at least the second apparatus to prevent installation of the address in the RIB of the at least the second apparatus.

15. The apparatus of claim 9, wherein the designated network mask is one of 0xffffffff, 0xfffffffe, or 0x00000001.

16. The apparatus of claim 9, wherein the apparatus is configured to determine a path for transmitting data using OSPF version 2 (OSPFv2).

17. A non-transitory computer-readable storage medium storing instructions that, when executed by at least one processor of an apparatus, cause the apparatus to:
   detect one or more connection to the apparatus;
   determine that a first interface coupling the apparatus to at least a second apparatus is a transit-only interface based at least upon the one or more connections, wherein the transit-only interface directly connects the first apparatus to the at least the second apparatus for transmission of data between the first apparatus and the at least the second apparatus; and
   generate a first Open Shortest Path First (OSPF) Link State Advertisement (LSA) that includes an address and a designated network mask, the designated network mask operating as a transit-only identification, the transit-only identification indicating that the address is not permitted to be installed in a Routing Information Base (RIB) of the at least the second apparatus upon receipt of the OSPF LSA at the at least the second apparatus;
   wherein, upon receipt of the OSPF LSA at the at least the second router, the address is not installed in the RIB of the at least the second router.

18. The non-transitory computer-readable storage medium of claim 17, storing the instructions that, when executed, further cause the apparatus to:
   determine that a second interface coupling the apparatus to at least a third apparatus is a not a transit-only interface based at least upon the one or more connections; and
   generate a second OSPF LSA that includes the address for the network but does not include the designated network mask, to permit installation of the address in a RIB of the at least the third apparatus upon receipt of the second OSPF LSA at the at least the third apparatus.

19. The non-transitory computer-readable storage medium of claim 18, storing the instructions that, when executed, further cause the apparatus to:
   send the second OSPF LSA to the at least the third apparatus; and
   cause the at least the third apparatus to determine that the second OSPF LSA does not include the designated network mask.

20. The non-transitory computer-readable storage medium of claim 19, storing the instructions that, when executed, further cause the apparatus to:
   cause the at least the third apparatus to permit installation of the address in the RIB of the at least the third apparatus.

* * * * *